US011671502B2

(12) United States Patent
Shahid et al.

(10) Patent No.: US 11,671,502 B2
(45) Date of Patent: Jun. 6, 2023

(54) TRANSITIONING COMMUNICATION SESSIONS ACROSS SERVICES

(71) Applicant: Microsoft Technology Licensing, LLC, Redmond, WA (US)

(72) Inventors: Khuram Shahid, Seattle, WA (US); Adarsh Sridhar, Issaquah, WA (US); Aleksandar Uzelac, Seattle, WA (US); Adina Trufinescu, Redmond, WA (US); Shahin Shayandeh, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/621,803

(22) Filed: Jun. 13, 2017

(65) Prior Publication Data

US 2018/0332122 A1 Nov. 15, 2018

Related U.S. Application Data

(60) Provisional application No. 62/503,789, filed on May 9, 2017.

(51) Int. Cl.
*H04L 67/148* (2022.01)
*H04L 67/141* (2022.01)
*G06F 9/46* (2006.01)
*G06F 9/54* (2006.01)

(52) U.S. Cl.
CPC ............ *H04L 67/148* (2013.01); *G06F 9/461* (2013.01); *G06F 9/543* (2013.01); *H04L 67/141* (2013.01)

(58) Field of Classification Search
CPC ..... H04L 67/148; H04L 67/141; G06F 9/461; G06F 9/543
See application file for complete search history.

(56) References Cited

U.S. PATENT DOCUMENTS

| 7,840,683 | B2 | 11/2010 | Zhang | |
|---|---|---|---|---|
| 10,659,566 | B1 * | 5/2020 | Luah | .................. G06F 11/3438 |
| 2003/0195963 | A1 * | 10/2003 | Song | ...................... G06F 16/95 709/227 |

(Continued)

FOREIGN PATENT DOCUMENTS

| CN | 101455055 A | 6/2009 |
|---|---|---|
| CN | 105052201 A | 11/2015 |
| CN | 106027791 A | 10/2016 |

OTHER PUBLICATIONS

"International Search Report and Written Opinion Issued in PCT Application No. PCT/US18/028456", dated Jul. 13, 2018, 10 Pages.

(Continued)

*Primary Examiner* — Mohamed A. Wasel
*Assistant Examiner* — Jihad K Boustany
(74) *Attorney, Agent, or Firm* — Calfee, Halter & Griswold LLP

(57) ABSTRACT

Systems and methods are disclosed for transitioning communication sessions across services. In one implementation, a first communication is received from a user via a first service. The first communication is associated with a communication session. The first communication is processed to identify a request with respect to a second service. The second service is initiated in response to the request.

19 Claims, 5 Drawing Sheets

(56) References Cited

U.S. PATENT DOCUMENTS

| | | | | |
|---|---|---|---|---|
| 2004/0222975 | A1* | 11/2004 | Nakano | G06F 3/0482 345/173 |
| 2013/0275164 | A1* | 10/2013 | Gruber | G10L 17/22 705/5 |
| 2015/0113471 | A1 | 4/2015 | Engstrom et al. | |
| 2016/0300570 | A1 | 10/2016 | Gustafson et al. | |
| 2016/0323235 | A1 | 11/2016 | Lindsay et al. | |
| 2016/0360336 | A1* | 12/2016 | Gross | H04W 4/025 |
| 2017/0041437 | A1* | 2/2017 | Singh | G06F 3/0482 |

OTHER PUBLICATIONS

Fitzpatrick, Jason, "How to Control Third-Party iOS Apps with Siri", https://www.howtogeek.com/276713/how-to-control-third-party-ios-apps-with-siri/https:/www.howtogeek.com/276713/how-to-control-third-party-ios-apps-with-siri/https:/www.howtogeek.com/276713/how-to-control-third-party-ios-apps-with-siri/, Published on: Oct. 19, 2016, 6 pages.

"Hey Siri, book me a ride", https://www.apple.com/newsroom/2016/09/hey-siri-book-me-a-ride/, Published on: Sep. 2016, 12 pages.

"Activate a foreground app with voice commands through Cortana", https://docs.microsoft.com/en-us/cortana/voicecommands/launch-a-foreground-app-with-voice-commands-in-cortana, Published on: Feb. 8, 2017, 17 pages.

Halligan, Brian, "GrowthBot", http://growthbot.org/, Retrieved on: May 16, 2017, 8 pages.

Monbiot, Natalie, "Early Learnings from the Bot-verse", https://www.umww.com/news/2016/04/early-learnings-from-the-bot-verse, Published on: Apr. 15, 2016, 8 pages.

Russell, Jon, "Chat app Kik launches a bot store and anyone can make bots for it", https://techcrunch.com/2016/04/05/chat-app-kik-launches-a-bot-store-and-anyone-can-make-bots-for-it/, Published on: Apr. 5, 2016, 16 pages.

"Launch an app from within another (iPhone)", https://stackoverflow.com/questions/419119/launch-an-app-from-within-another-iphone, Retrieved on: May 16, 2017, 7 pages.

Rhodes, Margaret, "With Quartz's App, You Don't Read the News. You Chat With It", https://www.wired.com/2016/02/with-quartzs-app-you-dont-read-the-news-you-chat-with-it/, Published on: Nov. 2, 2016, 6 pages.

Timsina, Amogh, "How to use the Google Now gesture to launch any Android app", http://appslova.com/how-to-use-the-google-now-gesture-to-launch-any-android-app/, Published on: Sep. 23, 2015, 4 pages.

"Office Action and Search Report Issued in Chinese Patent Application No. 201880030870.X", dated Nov. 24, 2022, 11 Pages.

"Summons to Attend Oral Proceedings Issued in European Patent Application No. 18727903.9", Mailed Date Dec. 23, 2021, 6 Pages.

"Office Action Issued in Indian Patent Application No. 201917044428", dated Feb. 7, 2022, 7 Pages.

"Office Action Issued in European Patent Application No. 18727903.9", dated Sep. 11, 2020, 4 Pages.

\* cited by examiner

TRANSITIONING COMMUNICATION SESSIONS ACROSS SERVICES

CROSS-REFERENCE TO RELATED APPLICATIONS

This application is related to and claims the benefit of priority to U.S. Patent Application No. 62/503,789, filed May 9, 2017, which is incorporated herein by reference in its entirety.

TECHNICAL FIELD

Aspects and implementations of the present disclosure relate to data processing and, more specifically, but without limitation, to transitioning communication sessions across services.

BACKGROUND

Personal digital assistants are applications or services that retrieve information or execute tasks on behalf of a user. Users can communicate with such personal digital assistants using conversational interfaces such as messaging or chat interfaces.

SUMMARY

The following presents a shortened summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a compact form as a prelude to the more detailed description that is presented later.

In one aspect of the present disclosure, systems and methods are disclosed for transitioning communication sessions across services. In one implementation, a first communication is received from a user via a first service. The first communication is associated with a communication session. The first communication is processed to identify a request with respect to a second service. The second service is initiated in response to the request.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
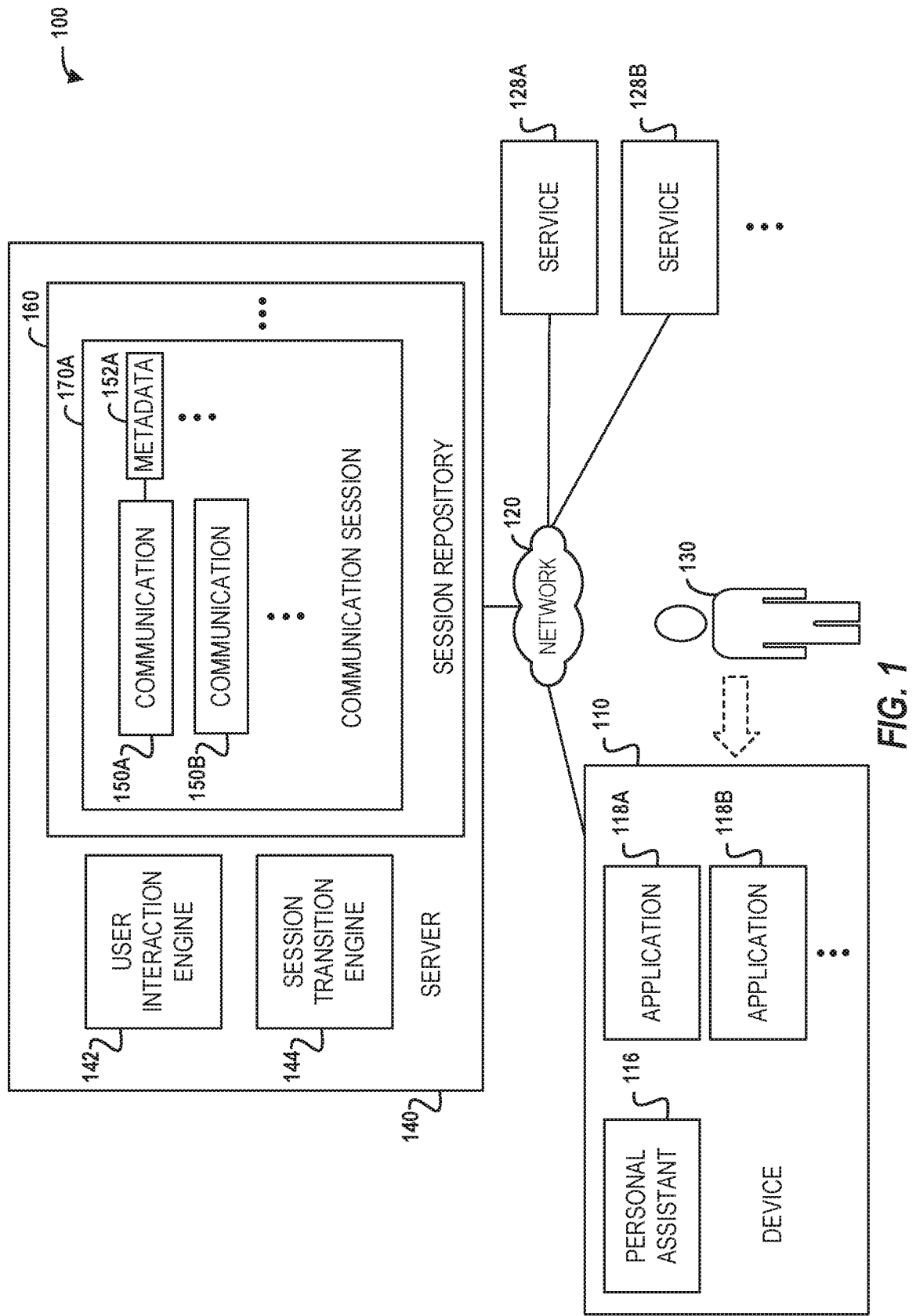
FIG. 1 illustrates an example system, in accordance with an example embodiment.

Aspects and implementations of the present disclosure are directed to transitioning communication sessions across services.

It can be appreciated that intelligent personal assistants and related technologies can enable a user to obtain information, execute tasks, and perform other activities. Users can interact with or control such personal assistants via conversational interfaces such as messaging, chat, audio commands etc. Though such conversational interfaces provide a natural and intuitive medium for performing certain tasks, these interfaces may be sub-optimal for other activities or operations. For example, it may be inefficient or ineffective to utilize a conversational interface (e.g., chat) to browse through many possible options, etc. As a result, though a user can initiate a communication session/conversation with a personal assistant, such a session can progress to a point at which it may be advantageous for the user to transition to another service, application, etc. However, in doing so the user may 'lose' various information, etc., included/referenced within the earlier communication(s) with the personal assistant.

Accordingly, described herein in various implementations are technologies, including methods, machine readable mediums, and systems, that enable transitioning communication sessions across services. For example, the described technologies can receive communications from a user (e.g., via a personal assistant) and associate these communications with an ongoing communication session. Subsequently, a user can request to transition or transfer their communication session to another service, application, etc. In response, the referenced communication session can be provided to the requested application, service, etc., as described herein. In doing so, a personal assistant can, for example, launch or initiate services, applications, etc., and can further provide access to the content of the communication session conducted with the user. Accordingly, communication sessions can be transitioned between applications/services, thereby enabling users to further leverage interfaces, features, etc., of such services while maintaining the content, context, etc., of the referenced communication session.

It can therefore be appreciated that the described technologies are directed to and address specific technical challenges and longstanding deficiencies in multiple technical areas, including but not limited to communication interfaces, semantic relationships, and personal digital assistants. As described in detail herein, the disclosed technologies provide specific, technical solutions to the referenced technical challenges and unmet needs in the referenced technical fields and provide numerous advantages and improvements upon conventional approaches. Additionally, in various implementations one or more of the hardware elements, components, etc., referenced herein operate to enable, improve, and/or enhance the described technologies, such as in a manner described herein.

FIG. 1 illustrates an example system 100, in accordance with some implementations. As shown, the system 100 includes device 110 which can be a laptop computer, a desktop computer, a terminal, a mobile phone, a tablet computer, a smart watch, a personal digital assistant (PDA), a digital music player, a server, and the like. User 130 can be a human user who interacts with device 110. For example, user 130 can provide various inputs (e.g., via an input device/interface such as a keyboard, mouse, touchscreen, etc.) to device 110. Device 110 can also display, project, and/or otherwise provide content to user 130 (e.g., via output components such as a screen, speaker, etc.).

As shown in FIG. 1, device 110 can include personal assistant 116. Personal assistant 116 can be an application or module that configures/enables the device to interact with, provide content to, and/or otherwise perform operations on behalf of user 130. For example, personal assistant 116 can receive communications and/or request(s) from user 130 and present/provide responses to such request(s) (e.g., within a conversational or 'chat' interface). In certain implementations, personal assistant 116 can also identify content that can be relevant to user 130 (e.g., based on a location of the user or other such context) and present such content to the user. Personal assistant 116 can also enable user 130 to initiate and/or configure other application(s) (e.g., application 118A, as described below). For example, personal assistant 116 can initiate an application (e.g., a media player application) that fulfills a request provided by the user. Personal assistant 116 can also initiate and/or perform various other operations, such as are described herein.

It should be noted that while various components (e.g., personal assistant 116) are depicted and/or described as operating on a device 110, this is only for the sake of clarity. However, in other implementations the referenced components can also be implemented on other devices/machines. For example, in lieu of executing locally at device 110, aspects of personal assistant 116 can be implemented remotely (e.g., on a server device or within a cloud service or framework). By way of illustration, personal assistant 116 can be configured to execute on a remote device (e.g., server 140, as described below) and provide communications, information, etc., to device 110.

Figure 5:
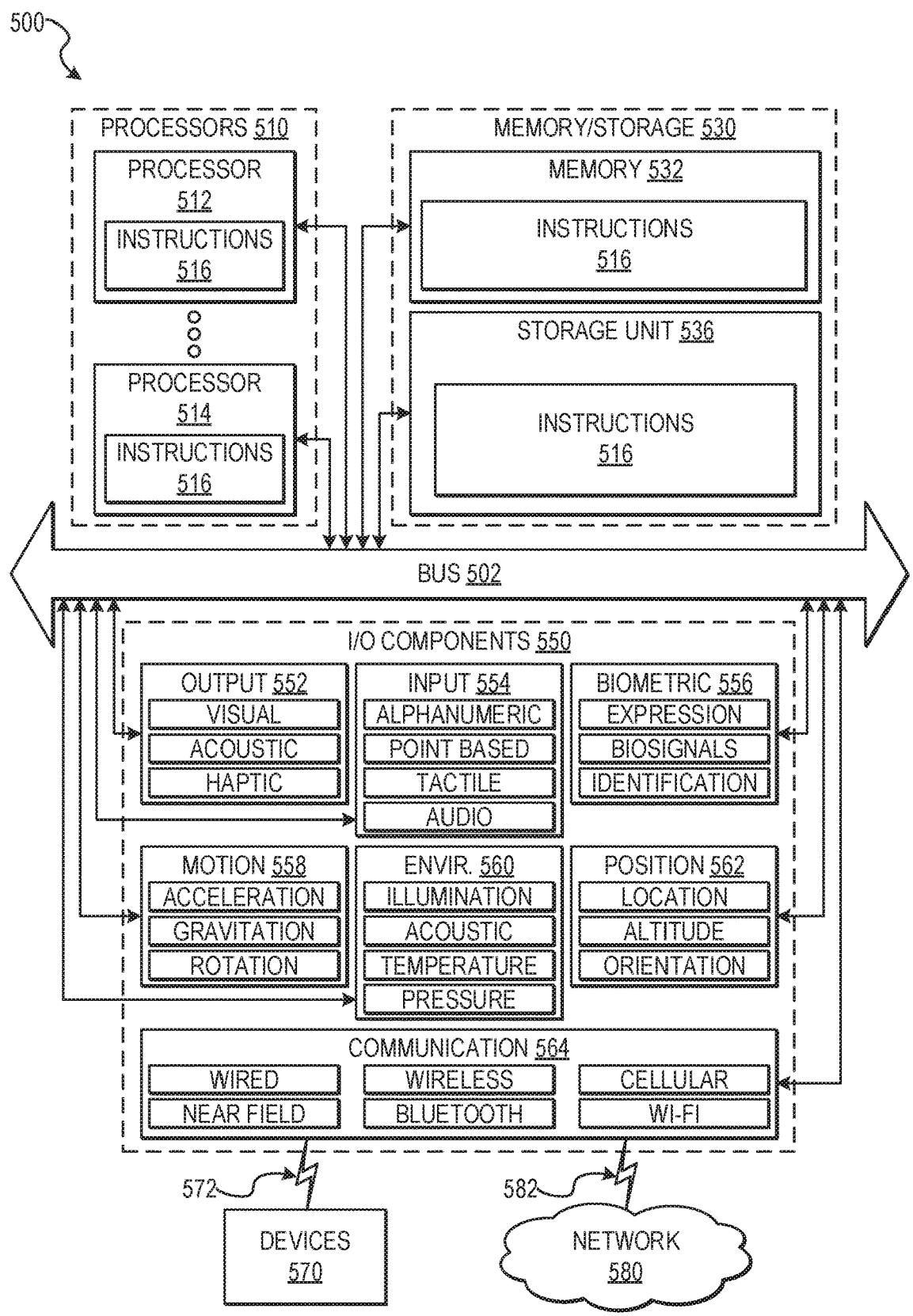
FIG. 5 is a block diagram illustrating components of a machine able to read instructions from a machine-readable medium and perform any of the methodologies discussed herein, according to an example embodiment.

As shown in FIG. 1, device 110 can also include various applications, programs, modules, etc., such as application 118A and application 118B. The referenced applications can be stored in memory of device 110 (e.g. memory 530 as depicted in FIG. 5 and described below). One or more processor(s) of device 110 (e.g., processors 510 as depicted in FIG. 5 and described below) can execute such application(s). In doing so, device 110 can be configured to perform various operations, present content to user 130, etc. Examples of such applications include but are not limited to: social media/messaging applications, applications that facilitate transactions (e.g., food purchases), etc.

It should also be noted that while various components (e.g., personal assistant 116, application 118A, etc.) are depicted (e.g., in FIG. 1) as operating on device 110, this is only for the sake of clarity. However, in other implementations the referenced components (e.g., application 118A) can also be implemented on other devices/machines. For example, in lieu of executing locally at device 110, application 118A (e.g., a ride-sharing application) can be implemented remotely (e.g., on a server device or within a cloud service or framework).

As also shown in FIG. 1, device 110 can connect to and/or otherwise communicate with server 140 via network 120. Network 120 can include one or more networks such as the Internet, a wide area network (WAN), a local area network (LAN), a virtual private network (VPN), an intranet, and the like.

Server 140 can be, for example, a server computer, computing device, storage service (e.g., a 'cloud' service), etc., and can include user interaction engine 142, session transition engine 144, and session repository 160.

User interaction engine 142 can be an application or module that configures/enables server 140 to perform various operations such as are described herein. For example, user interaction engine 142 can configure or enable server 140 to receive communication 150A, communication 150B, etc. (collectively, communications 150). Such communications 150 can be messages, transmissions, and/or other such content that a user can provide, e.g., via device 110. In certain implementations, such communications 150 can be messages, inputs (e.g., voice inputs, commands, etc.) that a user provides to device 110 via personal assistant 116 and/or application(s) 118.

The referenced communication(s) can be processed (e.g., by or in conjunction with user interaction engine 142). In doing so, user interaction engine 142 can generate and/or provide additional communications (e.g., replies, responses, other content, etc.) that can be directed to user 130 and/or device 110. Such communications originating from user interaction engine 142 can be, for example, directed to user 130 and/or device 110 in response to those prior communication(s) received from user 130/device 110. By way of illustration, upon receiving a communication from user 130/device 110 that includes or reflects a request for information (e.g., for the current weather in a particular location), user interaction engine 142 can identify or obtain the requested information and provide it in a reply communication in response to the referenced request.

In certain implementations, user interaction engine 142 can receive (and/or provide) multiple communications during the course of a communication session. Such a communication session can be a series of communications that are provided in relation to one another (e.g., in a sequence, in response to one another, within a defined amount of time/chronological proximity to one another, etc.). User interaction engine 142 can store such communications 150 as a communication session 170 within session repository 160. For example, as shown in FIG. 1, communication 150A (e.g., a request from user 130/device 110) and communication 150B (e.g., a response provided by user interaction engine 142) can be stored together and/or in association with one another as communication session 170A.

Session repository 160 can be a storage resource such as an object-oriented database, a relational database, etc. within which the contents of various associated communications 150 can be stored. In doing so, such associated communications 150 and/or communication sessions 170 can be utilized, transitioned, etc., across different applications, services, etc., as described herein.

By way of illustration, several initial communications can be received or provided within a first application or service (e.g., communications between a user and a personal assistant service). As described above, such communications can be stored together as a communication session. Subsequently, the user can request to transition the communication session to another service (e.g., a chat service that is accessible to additional users). In response to the referenced request, the stored communication session (reflecting the referenced prior communications and/or aspects thereof) can be provided or made accessible to the referenced chat service. In doing so, the user can access or utilize features or functionality of the second service, while continuing to leverage aspects of the stored communication session, as described herein.

Additionally, in certain implementations various additional information, such as metadata 152A (as shown in FIG. 1), can be stored in session repository 160. Such metadata/information can be information or content associated with the referenced communication(s) and/or communication sessions. For example, user identifier(s) associated with the participant(s) in a particular communication session can be associated with the communication(s) and/or communication session(s) and stored in repository 160. By way of further illustration, various identified aspects of the referenced communication(s) and/or communication session(s) (e.g., topics, preferences, settings, etc.) can be associated with the communication(s) and/or communication session(s) and stored in repository 160.

Additionally, in certain implementations, user interaction engine 142 can process the received communication(s), e.g., in order to identify, extract, etc. various content elements (e.g., words, intents, entities, actions, etc.) within the communication. By way of illustration, user interaction engine 142 can receive various communications from device 110 (e.g., a text communication, request, etc. that the user provides to personal assistant 116). User interaction engine 142 can process such communication(s) (e.g., using natural language processing and/or other such techniques) to parse the communication(s) and identify/extract content element(s) (e.g., entities, intents, actions, etc.) present within the received communication(s).

In certain implementations, the extracted content elements can also be stored within session repository 160 (e.g., in conjunction with the referenced communications 150 and/or communication sessions 170). In certain implementations, such content elements can be stored in accordance with an ontology, model, and/or schema which can, for example, reflect a knowledge base generated and maintained based on the referenced communications.

Figure 3B:
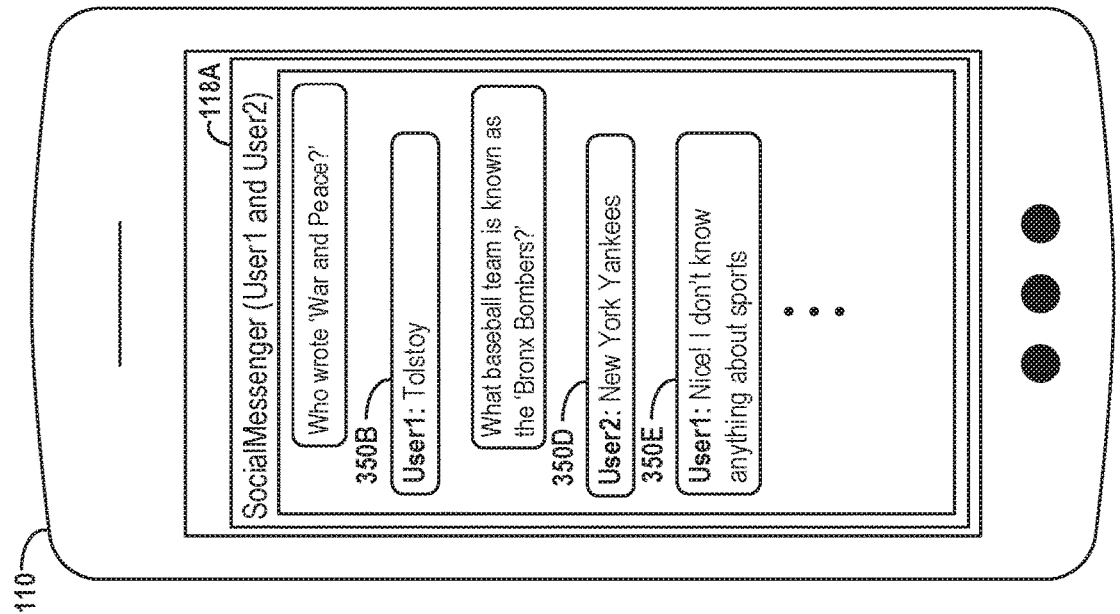
FIGS. 3A and 3B illustrate example scenarios described herein, according to an example embodiment.
Figure 3A:
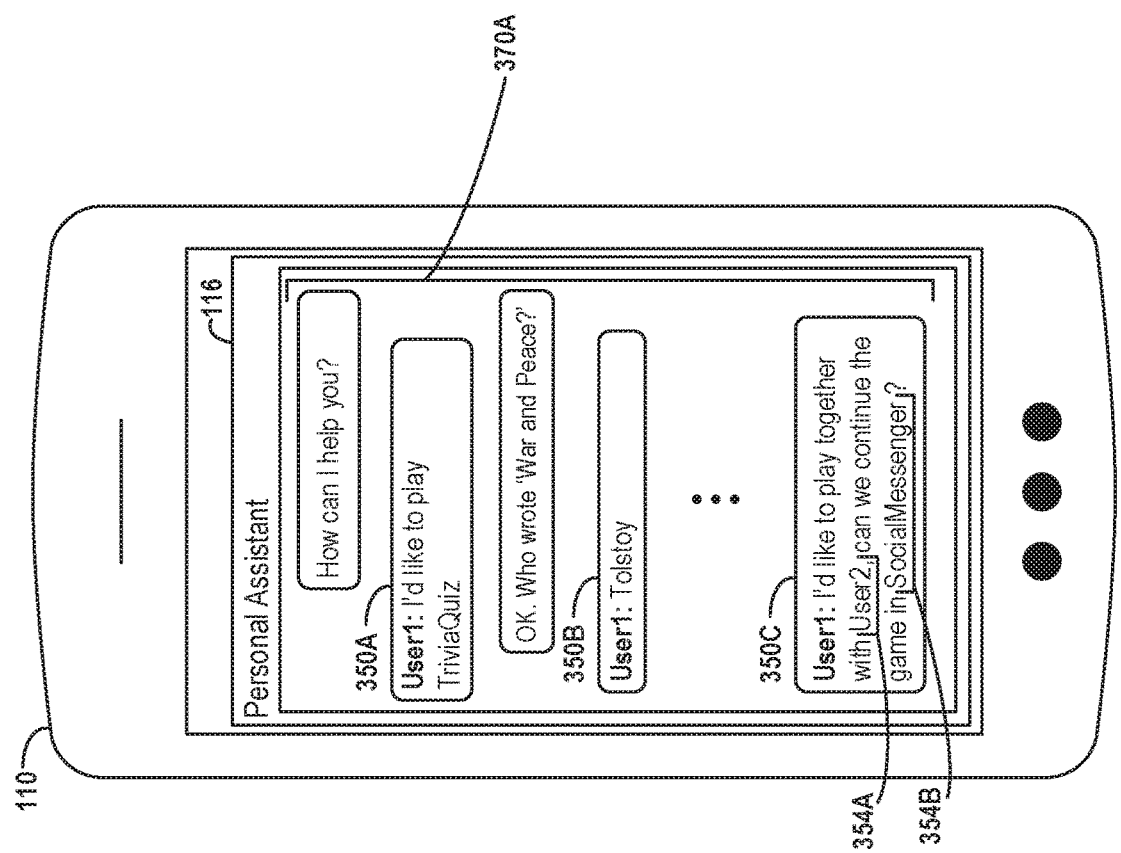
Figure 4B:
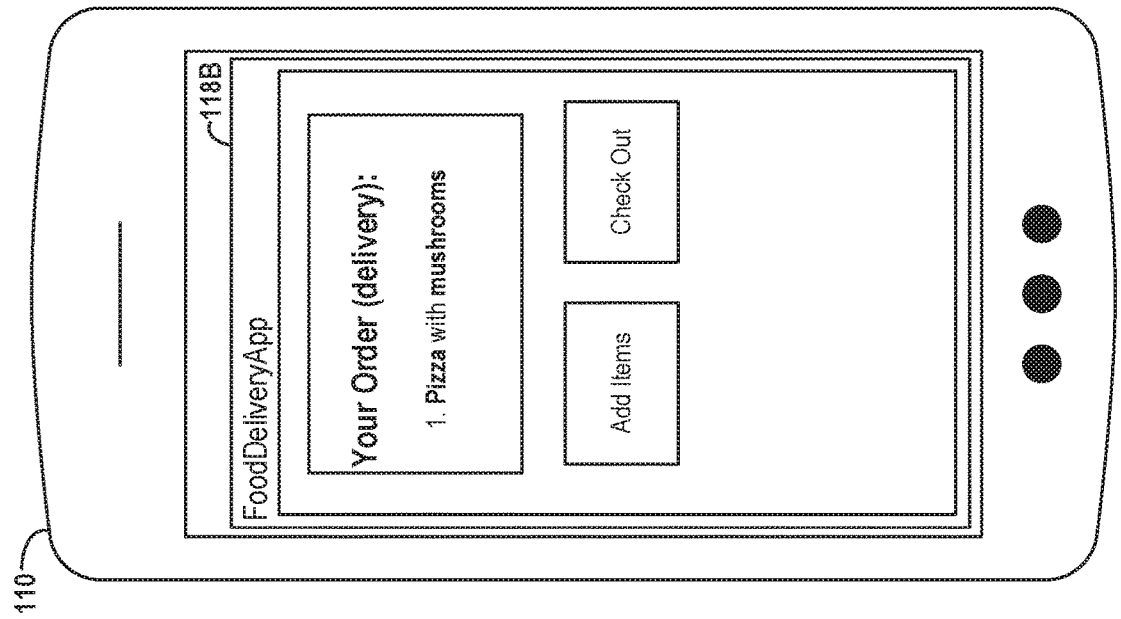
FIGS. 4A and 4B illustrate example scenarios described herein, according to an example embodiment.
Figure 4A:
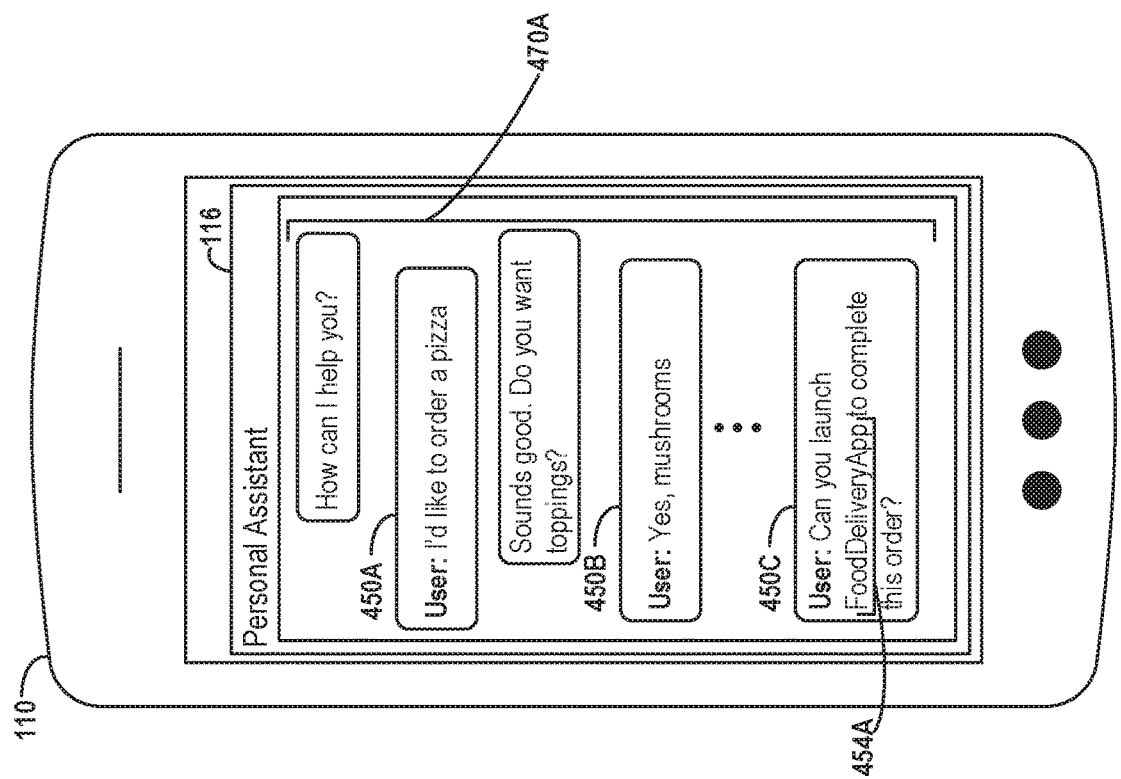

Moreover, in certain implementations, user interaction engine 142 can be configured to provide certain features, operations, functionality, etc. By way of illustration, user interaction engine 142 can be configured to provide a trivia game with respect to which a user can be provided with trivia questions, e.g., as depicted in FIGS. 3A and 3B and described herein. In certain implementations, user interaction engine 142 can maintain or access information/content pertaining to the referenced features (e.g., a database of trivia questions that can be present to players in a trivia game). User interaction engine 142 can also be configured to perform certain operations with respect to the referenced information/content and/or various communications received with respect to such content. For example, user interaction engine 142 can be configured to maintain the score of a user in the referenced trivia game. It should be understood that the referenced trivia game is merely one example of functionality provided by user interaction engine 142 and that any number of additional services, applications, etc., can also be provided in a comparable manner. For example, in another implementation user interaction engine 142 can be configured to enable a user to initiate a food delivery order, e.g., as depicted in FIGS. 4A and 4B and described herein.

In various implementations, the described technologies may control, instruct, or otherwise communicate with various services such as service 128A and service 128B (collectively services 128), as shown in FIG. 1. Such services can be, for example, third-party services that can provide various functionality, e.g., to user 130 (e.g., social media services, food delivery services, etc.) that may enhance or otherwise be relevant to certain operations described herein. In certain implementations, such services can be services that the user may communicate/interact with, e.g., via application(s) 118. For example, service 128A can be a social media messaging service that user 130 can access and/or communicate with via application 118A on device 110. By way of further example, service 128B can be a restaurant/food delivery service that user 130 can access and/or communicate with via application 118B on device 110.

As described herein, in certain implementations such services can access, receive content from, and/or otherwise utilize session repository 160 (e.g., via an application programming interface (API)). In doing so, various communication sessions 170 can transition between/across multiple services. By enabling services 128 to receive and/or utilize content (e.g., prior communications) from such communication sessions, a user can utilize features from one service while leveraging the contents of a communication session that began within/with respect to another service, as described herein.

Session transition engine 144 can be an application or module that configures/enables server 140 to perform various operations such as are described herein. For example, session transition engine 144 can configure or enable server 140 to process the referenced communications 150 (e.g., an input, message, etc. from a user) to identify a request associated with another service. In certain implementations, such a service can be a service not currently utilizing, accessing, or otherwise involved with the communication session.

For example, during communication with a personal assistant, user 130 can request to continue a conversation, task, operation, session, etc. via another application, service, etc. By way of illustration, a user can initiate a communication session with user interaction engine 142 (which can be configured to provide a trivia game) via personal assistant 116. During the course of the communication session with the referenced personal assistant, the user can request to transition to a social messaging application/service. Such a transition can be advantageous, for example, in order to involve other users in the communication session. As described in detail herein, FIG. 3A depicts a scenario in which user 130 requests to transition a communication session from personal assistant 116 to another application/service ("I'd like to play . . . ").

Having identified such a request (e.g., as reflected in communication 350C as shown in FIG. 3A), session transition engine 144 can initiate the application/service requested by the user. For example, session transition engine 144 can provide an instruction or command to launch the requested application 118 on device 110. By way of illustration, FIG. 3B depicts a scenario in which application 118A ('SocialMessenger') is launched/initiated on device 110 in response to communication 350C from user 130. In certain implementations session transition engine 144 can provide an instruction or command to initiate a service 128 requested by the user.

Session transition engine 144 can also provide the contents of the corresponding communication session 170 to the referenced application/service. In certain implementations, the referenced application/service can be provided with access to the referenced communication session (e.g., as stored in session repository 160). In doing so, the referenced communication session (e.g., session 370A as shown in FIG. 3A) can be transitioned from a first service (e.g., a personal assistant) to a second service (e.g., a social messaging service). In doing so, user 130 can access or utilize features, functionality of the second service while maintaining the content, context, etc., of the referenced communication session.

While many of the examples described herein are illustrated with respect to a single server 140, this is simply for the sake of clarity and brevity. However, it should be understood that the described technologies can also be implemented (in any number of configurations) across multiple servers and/or other computing devices/services.

Further aspects and features of device 110 and server 140 are described in more detail in conjunction with FIGS. 2-5, below.

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

Figure 2:
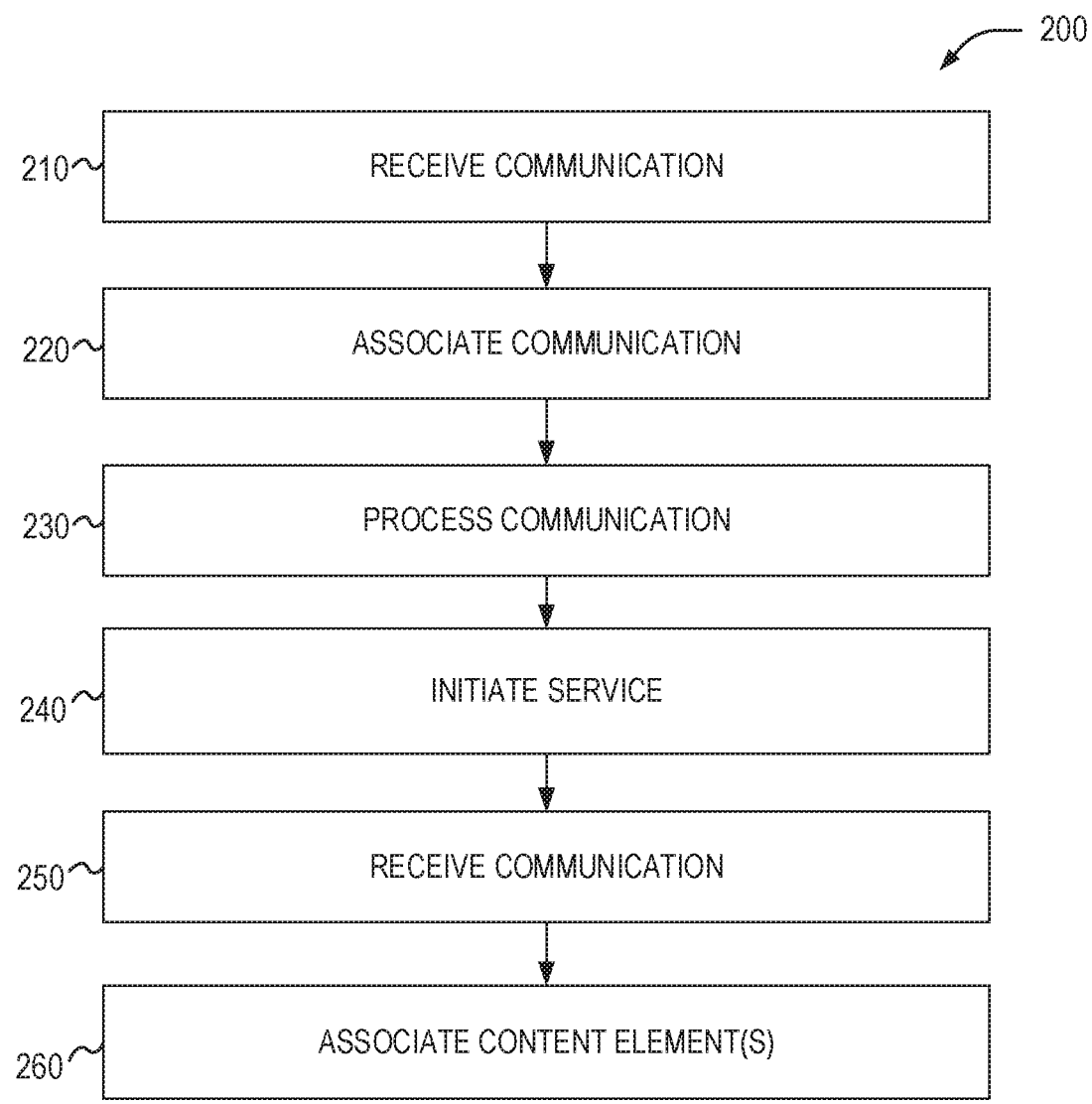
FIG. 2 is a flow chart illustrating a method, in accordance with an example embodiment, for transitioning communication sessions across services.

FIG. 2 is a flow chart illustrating a method 200, according to an example embodiment, for transitioning communication sessions across services. The method is performed by processing logic that can comprise hardware (circuitry, dedicated logic, etc.), software (such as is run on a computing device such as those described herein), or a combination of both. In one implementation, the method 200 is performed by one or more elements depicted and/or described in relation to FIG. 1 (including but not limited to server 140 and/or user interaction engine 142), while in some other implementations, the one or more blocks of FIG. 2 can be performed by another machine or machines.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At operation 210, a communication is received. In certain implementations, such a communication (e.g., a first communication) can originate/be received via a service (e.g., a first service). In certain implementations, such a service can be an application executing on a device associated with the user (e.g., personal assistant 116 or application 118A executing on device 110 as shown in FIG. 1). In other implementations, such a service can be an application executing on a central device (e.g., at service 128). Moreover, in certain implementations, such a communication can originate from a user (e.g., user 130). Such a communication can be, for example, a message/transmission (e.g., as provided within a messaging/chat interface or any other such communication framework).

For example, FIG. 3A depicts a scenario in in which personal assistant 116 is executing on device 110. As shown in FIG. 3A, various communications (e.g., communications 350A, 350B, etc.) can be provided/presented via personal assistant 116. By way of further example, FIG. 4A depicts a scenario in which communications 450A, 450B, etc. are provided/presented via personal assistant 116 executing on device 110.

In certain implementations, various aspects of operation 210 (as well as the other operations described with respect to FIG. 2) are performed by server 140, user interaction engine 142, and/or session transition engine 144 (e.g., as depicted in FIG. 1). In other implementations, such aspects can be performed by one or more other elements/components, such as those described herein.

At operation 220, the first communication (e.g., as received at operation 210) can be associated with a communication session. As noted above, such a communication session can include or reflect several communications that are provided in relation to one another (e.g., in a sequence, in response to one another, within a defined amount of time/chronological proximity to one another, etc.). Such communications can be stored as a communication session within session repository 160, as described herein. By associating/storing the referenced communication with a communication session that includes other communications, the content and context of the referenced communication session can be leveraged or otherwise accounted for in subsequent operations/scenarios, as described herein.

For example, as shown in FIG. 3A, communication 350B ("Tolstoy") can be associated with communication session 370A (which includes communications 350A and 350C, as well as communications from personal assistant 116, e.g., "OK. Who wrote . . . ," as shown). Such a communication session 370A can be stored in session repository 160, as shown in FIG. 1. As shown in FIG. 3A, communication session 370A reflects communications between user 130 and personal assistant 116 that utilize or otherwise incorporate functionality from user interaction engine 142 (providing, for example, the 'TriviaQuiz' game/service, as shown in FIG. 3A).

At operation 230, the first communication (e.g., as received at operation 210) is processed. In doing so, a request can be identified, e.g., with respect to a second service. As noted above, in certain implementations natural language processing and/or other such techniques can be employed to process the referenced communication.

For example, as shown in FIG. 3A, communication 350C (provided by user 130) can be processed. In doing so, various content items such as content item 354A ('User2') and content item 354B ('SocialMessenger') can be identified/extracted. By identifying such content items, a request originating from the user can be identified/determined. For example, by processing communication 350C, a request from user 130 to transition communication session 370A to another application/service ('SocialMessenger') can be identified.

By way of further example, as shown in FIG. 4A, communication 450C (provided by user 130) can be processed. In doing so, various content items such as content item 454A ('FoodDeliveryApp') can be identified/extracted. By identifying such content items, a request originating from the user can be identified/determined. For example, by processing communication 450C, a request from user 130 to transition communication session 470A (and/or aspects thereof) to another application/service ('FoodDeliveryApp') can be identified.

At operation 240, a second service is initiated. In certain implementations, such a service is initiated in response to the request (e.g. the request identified at operation 230). For example, as noted above, during the course of a communication session a user can request to transition to another application or service. Doing so can be advantageous, for example, in scenarios in which the referenced application/service provides additional features, functionality, etc., that are not available/accessible to the user (e.g., within the first application/service the user was communicating with).

By way of illustration, FIG. 3B depicts a scenario in which a second application/service (here, application 118A—'SocialMessenger') is initiated/launched (e.g., at device 110) in response to a request provided via a first application/service (personal assistant 116, as shown in FIG. 3A). Moreover, as shown, communication session 370A (and/or aspects/elements thereof) can be transitioned or transferred into the referenced application/service ('SocialMessenger'). For example, as shown in FIG. 3B, earlier communications from communication session 370A (e.g., between 'User1' and user interaction engine 142) can be transitioned, imported, etc., into the interface of application 118A. For example, communication 350B ('Tolstoy') can be imported into application 118A, e.g., in order to maintain a log (that is viewable by user 130) of previous answers provided by the user during the depicted game.

Moreover, in certain implementations, content, information, etc., from communication(s) within the first application/service can be used or accounted for in configuring the launch, initiation, etc., of the requested second application/service. For example, having identified (as shown in communication 350C of FIG. 3A) a request to transition communication session 370A to another application/service ('SocialMessenger') with 'User2,' such an application/service can be initiated in accordance with this request. For example, in addition to transferring content/communications from one application/service to another, the referenced second user ('User2') can also be invited to join or otherwise added to the second application/service ('SocialMessenger'), as shown in FIG. 3B.

In certain implementations, instruction(s) to initiate the referenced second application/service at a device associated with the user can be provided. For example, session transition engine 144 can provide instructions, commands, etc. to initiate, launch, etc., an application 118 at the referenced device 110 (e.g., an application providing access to 'SocialMessenger'). In certain implementations, instruction(s) can be provided to initiate the second application/service in conjunction with the communication session at a device associated with the user. For example, session transition engine 144 can provide the contents/aspects of, and/or access to the referenced communication session (e.g., 370A) to the second application/service (e.g., 'SocialMessenger,' as shown in FIG. 3B).

By way of further example, FIG. 4B depicts an example scenario in which another application/service is launched/initiated in response to a request from a user. In certain implementations, content, information, etc., from communications 450A, 450B received/provided within a first application/service (as shown in FIG. 4A) can be used or accounted for in configuring the launch, initiation, etc., of the requested second application/service (as shown in FIG. 4B). For example, having identified a request to transition communication session 470A (or elements thereof, e.g., those reflecting the depicted food order) to another application/service ('FoodDeliveryApp'), such an application/service can be initiated in accordance with this request. In certain implementations, aspects of the referenced communications 450A, 450B can be provided within and/or used to populate the initiated application/service (here, 'FoodDeliveryApp'). For example, as shown in FIG. 4B, application 118B can be initiated or otherwise populated with information corresponding to the order provided by the user via personal assistant 116 during communication session 470A. In doing so, the user can continue an operation, transaction, etc. within the referenced second application/service based on content, information, etc. (e.g., 'pizza,' 'mushrooms,' etc.) from communications initially provided within another application/service. Such a transition can be advantageous because, for example, the referenced second application/service can provide additional functionality not available via the first application/service (e.g., saved payment options, a graphical user interface preferred by the user for operations such as browsing through multiple options, etc.).

At operation 250, a second communication is received. In certain implementations, such a communication can be received from the user that provided the first communication (e.g., at operation 210). In other implementations, such a communication can be received from another user (e.g., a user invited to join a multi-user communication session). Additionally, in certain implementations such a communication can be received via the second service, e.g., the service identified at operation 230 and/or initiated/launched at operation 240.

By way of illustration, as shown in FIG. 3B, upon initiating/launching application 118A ('SocialMessenger'), the trivia game depicted within personal assistant 116 (as shown in FIG. 3A) can continue within application 118A. In doing so, various subsequent communications 350D, 350E can be received. Such received communications (e.g., from 'User1' and/or 'User2') can be further added to communication session 370A. In doing so, the referenced communication session can continue to be utilized in the manner described herein (e.g., by enabling yet further transitions, etc., between applications/services).

At operation 260, the second communication (e.g., as received at operation 250) is associated with the communication session (e.g., as described above at operation 220). As noted above, such received communications (e.g., from 'User1' and/or 'User2') can be further added to an ongoing communication session that can continue to be utilized in the manner described herein (e.g., by enabling yet further transitions, etc., between applications/services).

It should also be noted that while the technologies described herein are illustrated primarily with respect to transitioning communication sessions across services, the described technologies can also be implemented in any number of additional or alternative settings or contexts and towards any number of additional objectives. It should be understood that further technical advantages, solutions, and/or improvements (beyond those described and/or referenced herein) can be enabled as a result of such implementations.

Certain implementations are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example implementations, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some implementations, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module can also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor can be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In implementations in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API).

The performance of certain of the operations can be distributed among the processors, not only residing within a single machine, but deployed across a number of machines. In some example implementations, the processors or processor-implemented modules can be located in a single geographic location (e.g., within a home environment, an office environment, or a server farm). In other example implementations, the processors or processor-implemented modules can be distributed across a number of geographic locations.

The modules, methods, applications, and so forth described in conjunction with FIGS. 1-4B are implemented in some implementations in the context of a machine and an associated software architecture. The sections below describe representative software architecture(s) and machine (e.g., hardware) architecture(s) that are suitable for use with the disclosed implementations.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture can yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

FIG. 5 is a block diagram illustrating components of a machine 500, according to some example implementations, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein can be executed. The instructions 516 transform the general, non-programmed machine into a particular machine programmed to carry out the described and illustrated functions in the manner described. In alternative implementations, the machine 500 operates as a standalone device or can be coupled (e.g., networked) to other machines. In a networked deployment, the machine 500 can operate in the capacity of a server machine or a client machine in a server-client network environment, or as a peer machine in a peer-to-peer (or distributed) network environment. The machine 500 can comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 can include processors 510, memory/storage 530, and I/O components 550, which can be configured to communicate with each other such as via a bus 502. In an example implementation, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 512 and a processor 514 that can execute the instructions 516. The term "processor" is intended to include multi-core processors that can comprise two or more independent processors (sometimes referred to as "cores") that can execute instructions contemporaneously. Although FIG. 5 shows multiple processors 510, the machine 500 can include a single processor with a single core, a single processor with multiple cores (e.g., a multi-core processor), multiple processors with a single core, multiple processors with multiples cores, or any combination thereof.

The memory/storage 530 can include a memory 532, such as a main memory, or other memory storage, and a storage unit 536, both accessible to the processors 510 such as via the bus 502. The storage unit 536 and memory 532 store the instructions 516 embodying any one or more of the methodologies or functions described herein. The instructions 516 can also reside, completely or partially, within the memory 532, within the storage unit 536, within at least one of the processors 510 (e.g., within the processor's cache memory), or any suitable combination thereof, during execution thereof by the machine 500. Accordingly, the memory 532, the storage unit 536, and the memory of the processors 510 are examples of machine-readable media.

As used herein, "machine-readable medium" means a device able to store instructions (e.g., instructions 516) and data temporarily or permanently and can include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 516. The term "machine-readable medium" shall also be taken to include any medium, or combination of multiple media, that is capable of storing instructions (e.g., instructions 516) for execution by a machine (e.g., machine 500), such that the instructions, when executed by one or more processors of the machine (e.g., processors 510), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 550 can include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 can include many other components that are not shown in FIG. 5. The I/O components 550 are grouped according to functionality merely for simplifying the following discussion and the grouping is in no way limiting. In various example implementations, the I/O components 550 can include output components 552 and input components 554. The output components 552 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example implementations, the I/O components 550 can include biometric components 556, motion components 558, environmental components 560, or position components 562, among a wide array of other components. For example, the biometric components 556 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 558 can include acceleration sensor components (e.g., accelerometer), gravitation sensor components, rotation sensor components (e.g., gyroscope), and so forth. The environmental components 560 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 562 can include location sensor components (e.g., a Global Position System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 550 can include communication components 564 operable to couple the machine 500 to a network 580 or devices 570 via a coupling 582 and a coupling 572, respectively. For example, the communication components 564 can include a network interface component or other suitable device to interface with the network 580. In further examples, the communication components 564 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 can be another machine or any of a wide variety of peripheral devices (e.g., a peripheral device coupled via a USB).

Moreover, the communication components 564 can detect identifiers or include components operable to detect identifiers. For example, the communication components 564 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 564, such as location via Internet Protocol (IP) geolocation, location via Wi-Fi® signal triangulation, location via detecting an NFC beacon signal that can indicate a particular location, and so forth.

In various example implementations, one or more portions of the network 580 can be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 580 or a portion of the network 580 can include a wireless or cellular network and the coupling 582 can be a Code Division Multiple Access (CDMA) connection, a Global System for Mobile communications (GSM) connection, or another type of cellular or wireless coupling. In this example, the coupling 582 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 516 can be transmitted or received over the network 580 using a transmission medium via a network interface device (e.g., a network interface component included in the communication components 564) and utilizing any one of a number of well-known transfer protocols (e.g., HTTP). Similarly, the instructions 516 can be transmitted or received using a transmission medium via the coupling 572 (e.g., a peer-to-peer coupling) to the devices 570. The term "transmission medium" shall be taken to include any intangible medium that is capable of storing, encoding, or carrying the instructions 516 for execution by the machine 500, and includes digital or analog communications signals or other intangible media to facilitate communication of such software.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Although an overview of the inventive subject matter has been described with reference to specific example implementations, various modifications and changes can be made to these implementations without departing from the broader scope of implementations of the present disclosure. Such implementations of the inventive subject matter can be referred to herein, individually or collectively, by the term "invention" merely for convenience and without intending to voluntarily limit the scope of this application to any single disclosure or inventive concept if more than one is, in fact, disclosed.

The implementations illustrated herein are described in sufficient detail to enable those skilled in the art to practice the teachings disclosed. Other implementations can be used and derived therefrom, such that structural and logical substitutions and changes can be made without departing from the scope of this disclosure. The Detailed Description, therefore, is not to be taken in a limiting sense, and the scope of various implementations is defined only by the appended claims, along with the full range of equivalents to which such claims are entitled.

As used herein, the term "or" can be construed in either an inclusive or exclusive sense. Moreover, plural instances can be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and can fall within a scope of various implementations of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of implementations of the present disclosure as represented by the appended claims. The specification and drawings are, accordingly, to be regarded in an illustrative rather than a restrictive sense.

What is claimed is:

1. A system comprising:
a processing device; and
memory coupled to the processing device and storing instructions that, when executed by the processing device, cause the system to perform operations comprising:
receiving, by a digital assistant that is being executed by the processing device, a first communication from a user;
assigning the first communication to a communication session between the user and the digital assistant;
generating, by the digital assistant, a response to the first communication, where the response is assigned to the communication session;
subsequent to generating the response, receiving, by the digital assistant, a second communication from the user to the digital assistant;
based upon the second communication, determining, by the digital assistant, that the user is requesting that a computer-executable service be initiated;
in response to determining that the user is requesting that the computer-executable service be initiated, initiating the computer-executable service; and
populating the computer executable service with the response to the first communication from the communication session upon the computer-executable service being initiated.

2. The system of claim 1, wherein initiating the computer-executable service comprises providing an instruction to initiate the computer-executable service at a device associated with the user.

3. The system of claim 1, wherein initiating the computer-executable service comprises providing an instruction to initiate the computer-executable service in conjunction with the communication session at a device associated with the user.

4. The system of claim 1, the operations further comprising:
receiving, by the digital assistant, a plurality of communications from the user prior to receiving the first communication;
storing the plurality of communications in a session repository; and
making the session repository available to the computer-executable service.

5. The system of claim 1, wherein initiating the computer-executable service comprises providing a named entity extracted from the communication session to the computer-executable service.

6. The system of claim 1, wherein at least a portion of the digital assistant is executing on a device associated with the user.

7. The system of claim 1, wherein at least a portion of the digital assistant is executing on a central device.

8. A method comprising:
receiving, at a user interaction engine executing on a server computing device and from a digital assistant, a first communication from a user to the digital assistant;
assigning, by the user interaction engine, the first communication to a communication session assigned to the user;
receiving, at the user interaction engine and from the digital assistant, a response to the first communication generated by the digital assistant;
assigning, by the user interaction engine, the response to the communication session;
subsequent to receiving the response, receiving, by the user interaction engine and from the digital assistant, a second communication from the user to the digital assistant;
based upon the second communication, identifying, by a session transition engine executing on the server computing device, a request with respect to a computer-executable service, the request indicating that the communication session is to be transferred to the computer-executable service;
initiating, by the session transition engine, the computer-executable service in response to identifying the request; and
populating, by the session transition engine, the computer-executable service with the communication session for use by the computer-executable service in future user interactions with the user.

9. The method of claim 8, wherein initiating the computer-executable service comprises providing an instruction to initiate the computer-executable service at a device associated with the user.

10. The method of claim 8, further comprising:
receiving, by the user interaction engine, a plurality of communications from the user to the digital assistant prior to receiving the first communication;
storing, by the user interaction engine, the plurality of communications in a session store; and
wherein populating the computer-executable service with the communication session comprises making the session store available to the computer-executable service.

11. The method of claim 8, wherein:
the computer-executable service is a social messaging service;
the request is to communicate with one or more users via the social messaging service; and
wherein populating the computer-executable service with the communication session comprises making all prior communications assigned to the communication session available to the one or more users.

12. The method of claim 8, wherein populating the computer-executable service with the communication session comprises importing at least a portion of prior communications from the user to the digital assistant into a user interface of the computer-executable service.

13. The method of claim 8, wherein the digital assistant is executing on a device associated with the user.

14. The method of claim 8, wherein the digital assistant is executing on a central device.

15. A non-transitory computer-readable medium comprising a user interaction engine and a session transition engine that, when executed by a processor, cause the processor to perform acts comprising:
receiving, by the user interaction engine and from a digital assistant, a first communication from a user to the digital assistant;
assigning, by the user interaction engine, the first communication to a communication session assigned to the user;
receiving, by the user interaction engine and from the digital assistant, a response to the first communication generated by the digital assistant;
assigning, by the user interaction engine, the response to the communication session;
subsequent to receiving the response, receiving, by the user interaction engine and from the digital assistant, a second communication from the user to the digital assistant;

based upon the second communication, identifying, by the session transition engine, a request with respect to a computer-executable service, the request indicating that the communication session is to be transferred to the computer-executable service;

initiating, by the session transition engine, the computer-executable service in response to identifying the request; and populating, by the session transition engine, the computer-executable service with the communication session for use by the computer-executable service in future user interactions with the user.

16. The non-transitory computer-readable medium of claim 15, wherein initiating the computer-executable service comprises providing an instruction to initiate the computer-executable service at a device associated with the user.

17. The non-transitory computer-readable medium of claim 15, the acts further comprising:

receiving, by the user interaction engine, a plurality of communications from the user to the digital assistant prior to receiving the first communication;

storing, by the user interaction engine, the plurality of communications in a session store; and wherein populating the computer-executable service with the communication session comprises making the session store available to the computer-executable service.

18. The non-transitory computer-readable medium of claim 15, wherein:

the computer-executable service is a social messaging service;

the request is to communicate with one or more users via the social messaging service; and wherein populating the computer-executable service with the communication session comprises making all prior communications assigned to the communication session available to the one or more users.

19. The non-transitory computer-readable medium of claim 15, the acts further comprising:

subsequent to initiating the computer-executable service, receiving, by the user interaction engine and from the computer-executable service, a third communication set forth by the user to the computer-executable service; and assigning, by the user interaction engine, the response to the communication session.

* * * * *